US008932022B2

(12) United States Patent
Ivakitch et al.

(10) Patent No.: US 8,932,022 B2
(45) Date of Patent: Jan. 13, 2015

(54) FASTENING SYSTEM FOR FAN AND SHAFT INTERCONNECTION

(75) Inventors: Richard Ivakitch, Toronto (CA); Andreas Eleftheriou, Woodbridge (CA); Alain Carrieres, Boucherville (CA)

(73) Assignee: Pratt & Whitney Canada Corp., Longueuil, Quebec ( * ) Notice: Subject to any disclaimer, the term of this patent is extended or adjusted under 35 U.S.C. 154(b) by 520 days.

(21) Appl. No.: 13/365,557

(22) Filed: Feb. 3, 2012

(65) Prior Publication Data
US 2013/0202450 A1  Aug. 8, 2013

(51) Int. Cl.
F01D 5/02 (2006.01)

(52) U.S. Cl.
USPC ...................................... 416/204 R

(58) Field of Classification Search
CPC ....... F01D 5/025; F04D 29/20; F04D 29/263; F04D 29/266
USPC ............................... 416/204 R; 401/258, 262
See application file for complete search history.

(56) References Cited

U.S. PATENT DOCUMENTS

| | | | |
|---|---|---|---|
| 3,280,948 A * | 10/1966 | Carriere | 192/48.3 |
| 3,373,648 A | 3/1968 | Gross | |
| 3,603,626 A | 9/1971 | Whiteside | |
| 3,628,886 A | 12/1971 | Andvig | |
| 3,835,615 A | 9/1974 | King, Jr. | |
| 3,941,027 A | 3/1976 | Gibson, Jr. et al. | |
| 4,028,909 A | 6/1977 | Jancic et al. | |
| 4,048,898 A | 9/1977 | Salter | |
| 4,102,603 A * | 7/1978 | Smith et al. | 416/244 A |
| 4,496,259 A | 1/1985 | Foucher | |
| 4,566,857 A | 1/1986 | Brumen | |
| 4,607,971 A | 8/1986 | Hartmann et al. | |
| 4,688,378 A | 8/1987 | Harris | |
| 4,869,632 A | 9/1989 | Radtke | |
| 5,228,284 A | 7/1993 | Carruthers et al. | |
| 5,279,031 A | 1/1994 | Carruthers et al. | |
| 5,447,399 A | 9/1995 | Yoshida et al. | |
| 5,603,592 A | 2/1997 | Sadri et al. | |
| 5,848,874 A | 12/1998 | Heumann et al. | |
| 6,199,453 B1 | 3/2001 | Steinbock | |
| 6,200,223 B1 | 3/2001 | Martens | |
| 6,216,442 B1 | 4/2001 | Belsom et al. | |
| 6,428,272 B1 | 8/2002 | Pepi et al. | |
| 6,638,008 B2 | 10/2003 | Sathianathan et al. | |
| 6,669,393 B2 | 12/2003 | Schilling | |
| 7,037,065 B2 | 5/2006 | Reigl | |

(Continued)

*Primary Examiner* — Ninh H Nguyen
(74) *Attorney, Agent, or Firm* — Norton Rose Fulbright Canada LLP

(57) ABSTRACT

A fan and shaft assembly for a turbofan gas turbine engine comprises a shaft and a fan. Sets of aligned throughbores are respectively of the shaft and the fan, at a junction between the shaft and the fan. Fastening systems are provided for the sets of aligned throughbores. Each fastening system comprises a sleeve received in one of the sets of aligned throughbores and sized to fit without play in the set of aligned throughbores. A head of the sleeve abuts a surface at the junction between the shaft and the fan. A fastener is inserted in the sleeve and extends beyond both ends of the sleeve to clamp the fan to the shaft, the fastener being loosely received in the sleeve. A method for replacing a component of a fastening system retaining a fan to a shaft is provided as well.

16 Claims, 3 Drawing Sheets

(56) References Cited

U.S. PATENT DOCUMENTS

| | | | |
|---|---|---|---|
| 7,195,447 B2 * | 3/2007 | Moniz et al. | 415/69 |
| 7,271,515 B2 * | 9/2007 | Joho | 310/61 |
| 7,661,931 B1 | 2/2010 | Matheny | |
| 7,704,044 B1 | 4/2010 | Matheny | |
| 7,748,661 B2 | 7/2010 | Harris et al. | |
| 7,805,946 B2 | 10/2010 | Ohri et al. | |
| 7,874,777 B1 | 1/2011 | Howie, Jr. | |
| 2011/0052399 A1 | 3/2011 | Radomski | |

* cited by examiner

FASTENING SYSTEM FOR FAN AND SHAFT INTERCONNECTION

FIELD OF THE INVENTION

The present disclosure relates to fastening systems used to interconnect a fan to a shaft in aircraft, for instance between a fan and a low pressure shaft in a gas turbine engine.

BACKGROUND OF THE INVENTION

Fasteners such as bolts are commonly used to interconnect fans to shafts in aircraft engines, for instance in gas turbine engines. The bolts are inserted in sets of aligned throughbores between the shaft and the fan. The bolts must be precisely machined so as to be inserted without play in the throughbores, and are hence relatively expensive parts. Hence, in addition to the axial pre-load clamping, the bolts are subjected to shear loads between the fan and the shaft. Accordingly, the bolts may be damaged over time and must be replaced.

SUMMARY

In one aspect, there is provided a fan and shaft assembly for a turbofan gas turbine engine comprising: a shaft; a fan; sets of aligned throughbores respectively of the shaft and the fan, at a junction between the shaft and the fan; fastening systems for the sets of aligned throughbores, each fastening system comprising a sleeve received in one of the sets of aligned throughbores and sized to fit without play in the set of aligned throughbores, a head of the sleeve abutting a surface at the junction between the shaft and the fan; and a fastener inserted in the sleeve and extending beyond both ends of the sleeve to clamp the fan to the shaft, the fastener being loosely received in the sleeve.

In a second aspect, there is provided a method for replacing a component of a fastening system retaining a fan to a shaft, comprising: removing a fastener from a sleeve, the fastener clamping the fan to the shaft; pulling the sleeve out of engagement with the fan and the shaft; inserting a replacement sleeve into engagement with the fan and the shaft, without play therebetween; and installing the fastener in the replacement sleeve to clamp the fan to the shaft.

In a third aspect, there is provided a fastening system for interconnecting a fan to a shaft in a turbofan gas turbine comprising: a sleeve configured to be received in a set of aligned throughbores at a junction between the fan and the shaft, an outer diameter of the sleeve being sized to fit without play in the set of aligned throughbores, and a length of the sleeve being sized so as not to extend beyond the set of aligned throughbores at a first end, the sleeve having a head configured to abut a surface of one of the shaft and the fan adjacent to the throughbore at a second end; and a fastener having an outer diameter sized to be loosely received in the sleeve, the fastener having a length to extend beyond both ends of the sleeve to clamp the fan to the shaft.

Further details of these and other aspects of the present invention will be apparent from the detailed description and figures included below.

DESCRIPTION OF THE DRAWINGS

Reference is now made to the accompanying figures, in which.

DETAILED DESCRIPTION OF THE PREFERRED EMBODIMENTS

Figure 1:
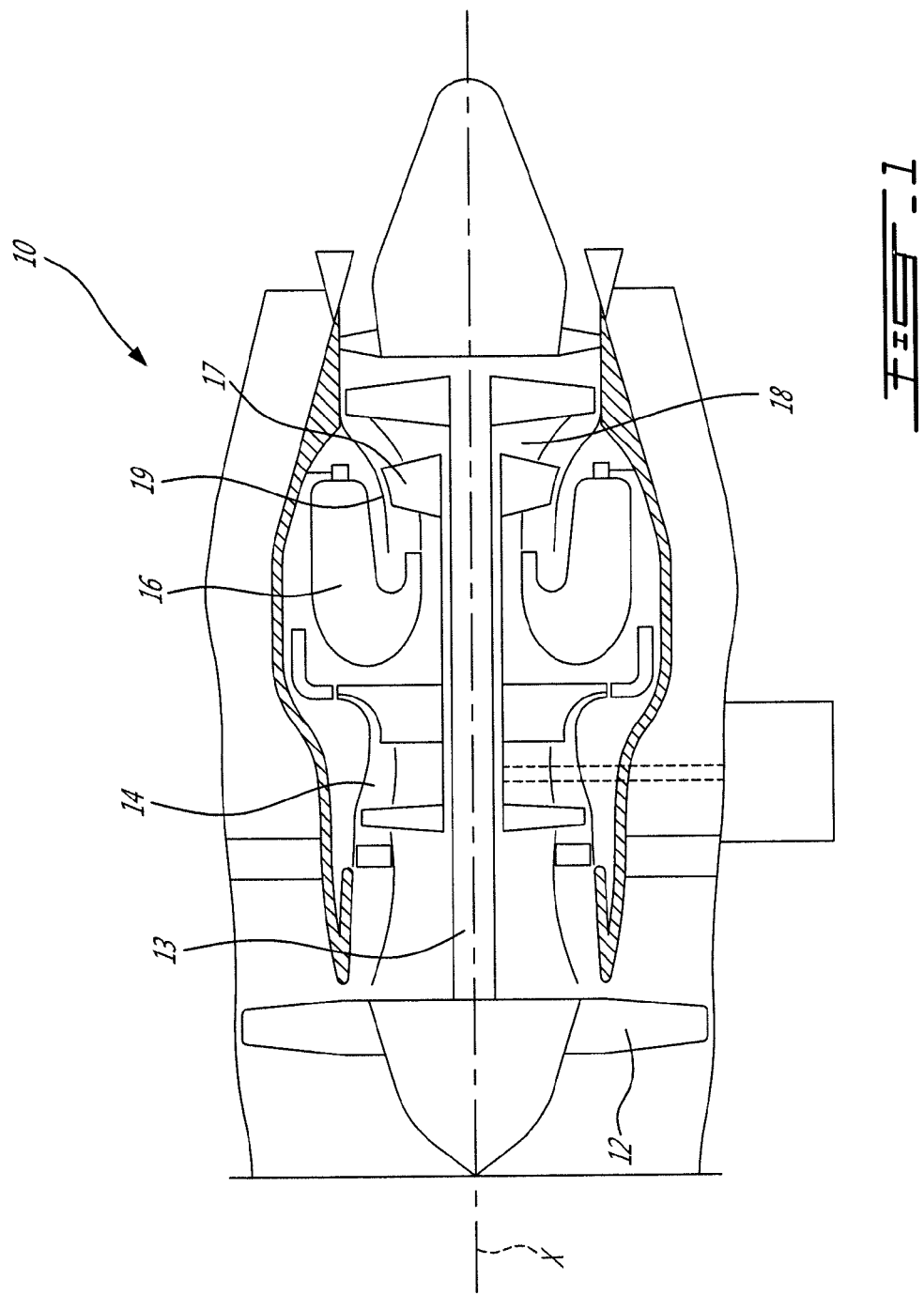
FIG. 1 is a schematic view of a gas turbine gas featuring fastening systems of the present disclosure.

FIG. 1 illustrates a turbofan gas turbine engine 10 of a type preferably provided for use in subsonic flight, generally comprising in serial flow communication a fan 12 through which ambient air is propelled and mounted to a forward end of a low pressure shaft, a multistage compressor 14 for pressurizing the air, a combustor 16 in which the compressed air is mixed with fuel and ignited for generating an annular stream of hot combustion gases, and a turbine section 18 for extracting energy from the combustion gases. A longitudinal axis of the engine 10 is generally shown as X.

Figure 2:
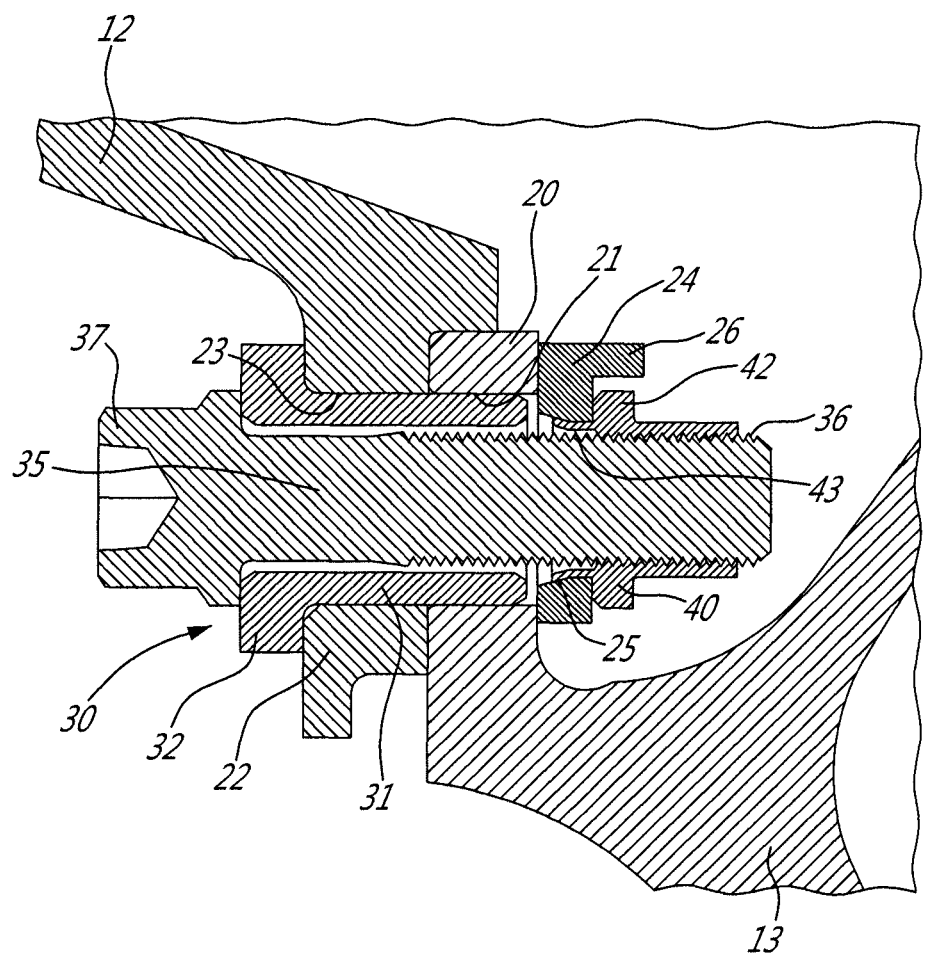
FIG. 2 is a sectional view of one of the fastening system connecting a fan to a shaft in the gas turbine engine of FIG. 1.

Referring to FIG. 2, one known interconnection configuration at a junction between the fan 12 and the shaft 13 is shown in greater detail. According to this interconnection configuration, the shaft 13 has at a generally forward end an annular wall 20 having a plurality of throughbores 21 circumferentially distributed on the annular wall 20. By being circumferentially distributed, it is meant that the throughbores 21 are spaced apart along a circumference of the annular wall 20. The annular wall 20 is fixed to the shaft 13 so as to rotate therewith.

An annular wall 22 is part of the fan 12. The annular wall 22 also has a plurality of throughbores 23, also circumferentially distributed on the annular wall 22. When the fan 12 is secured to the shaft 13, the annular walls 20 and 22 are co-planar. The annular walls 20 and 22 may have an equivalent amount of throughbores 21 and 23, respectively, and sets of throughbores 21 and 23 are in register (i.e., axially aligned) when the annular walls 20 and 22 are co-planar. Therefore, a fastener may be inserted through each set of throughbores 21 and 23.

Figure 3:
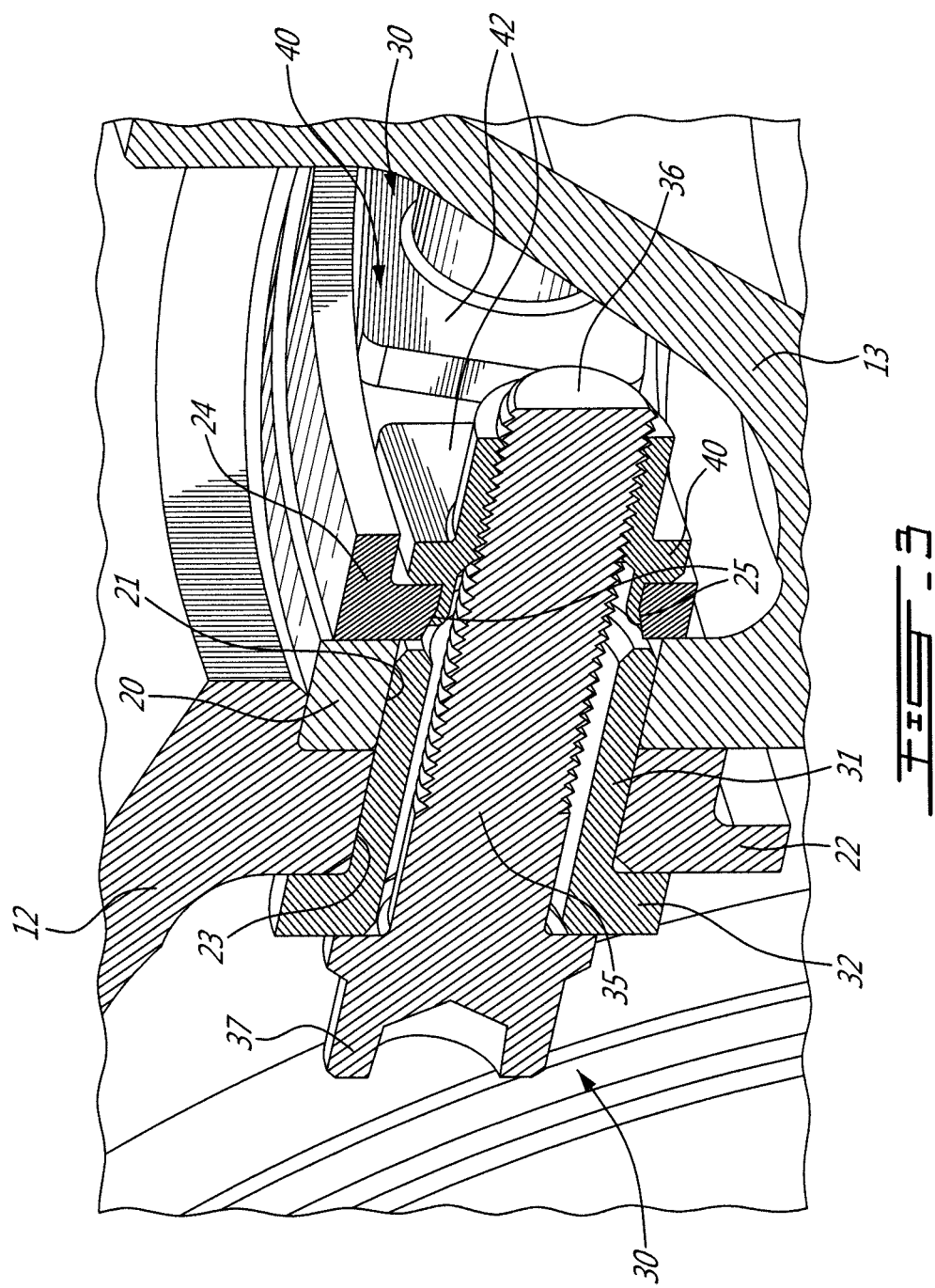
FIG. 3 is a perspective view, sectioned, of the fastening system of FIG. 2.

A ring 24 may be located on a free side of the annular wall 20, and may be in co-planar relation with the annular wall 20. Accordingly, the annular wall 20 may be sandwiched between the annular wall 22 and the ring 24. The ring 24 has throughbores 25 circumferentially distributed thereon. The number of throughbores 25 on the ring 24 may be equivalent to that of the annular walls 20 and 22, with sets of the throughbores 21, 23 and 25 being axially aligned for a fastener to be introduced in each set of throughbores 21, 23, 25. A flange 26 may be provided as part of the ring 24. The flange 26 may project axially away from the annular wall 20, and may be located on a radially outermost edge of the ring 24, as shown in FIGS. 2 and 3.

The fan 12 is secured to the shaft 13 by way of a plurality of fastening systems. One of the fastening systems is generally shown at 30 in FIGS. 2 and 3. Each of the fastening systems 30 comprises a sleeve 31. The sleeve 31 may also be known as a bushing, pin, etc. The sleeve 31 has a tubular body with a head 32 (or flange) at one end thereof. The head 32 projects radially from an axial dimension of the sleeve 31.

The tubular body of the sleeve 31 has an outer diameter that is specifically manufactured (e.g., machined or moulded) to be tightly received in a set of throughbores 21 and 23, i.e., without play between the sleeve 31 and either one of the surfaces of the throughbores 21 and 23. The sleeve 31 has a selected length, such that the tubular portion extends through the throughbore 23 and into the throughbore 21, while not extending axially beyond the distal surface annular wall 20 (and therefore not into throughbore 25). Moreover, as illustrated in FIGS. 2 and 3, the end of the sleeve 31 may be spaced from the plane of the distal surface of the annular wall 20.

The inner diameters of the throughbores 21 and 23 and the outer diameter of the tubular portion of the sleeve 31 are selected and subsequently manufactured to generally prevent play therebetween such that the sleeve 31 will absorb shearing loads resulting from the combined action of the fan 12 and the shaft 13. A thickness of the sleeve 31, namely the difference between the outer diameter and the inner diameter, is selected according to different factors. Firstly, a male part of a fastener, such as bolt 35, will be inserted in the sleeve 31. It is desired that the bolt 35 be loosely received in the sleeve 31 so as not to contact the inner surface of the sleeve 31, or have at most a partial contact with the inner surface of the sleeve 31, thereby reducing the exposure of the bolt 35 to shear loads. Therefore, the inner diameter of the sleeve 31 is selected as a function of the diameter of the bolt 35 that will be used therewith. Moreover, the thickness of the sleeve 31 may impact its rigidity. It may be desired that the sleeve 31 deform to some extent as a response to shear loads caused by the fan 12 and the shaft 13. By having the sleeves 31 deform slightly, the shear load will be shared among the sleeves 31 extending circumferentially about the shaft 13.

The bolt 35 comprises a threaded rod 36 and a head 37. As mentioned above, and in an embodiment, an outer diameter of the rod 36 is smaller than that of an inner diameter of the sleeve 31 for the loose fit of the threaded rod 36 in the sleeve 31. In terms of length, the threaded rod 36 is longer than the sleeve 31, for the end of the threaded rod 36 to extend beyond an end of the sleeve 31, for subsequent threading engagement to nut 40, the female part of the fastener. The head 37 may have any appropriate mating configuration such as a hexagonal socket, bolt head, etc.

The nut 40 may be of any appropriate type for use with the bolt 35. In the illustrated embodiment, the nut 40 may be a clinch nut. The nut 40 is tapped so as to be threadingly engaged to the threaded rod 36 of the bolt 35. A head 42 of the nut may have a square shape or any other appropriate shape, so as to come into abutment with flange 26 of the ring 24. Therefore, the engagement between the head 42 and the flange 26 blocks a rotation of the nut 40, for instance when the bolt 35 is being screwed into engagement with the nut 40. An extension 43 may be provided and extend inwardly from the head 42 and into engagement with an inner surface of the throughbore 25. This insures that the nut 40 stays attached to the ring 24. Accordingly, the embodiment of the nut 40 shown in FIGS. 2 and 3 is well suited when limited access is provided to one side of the annular wall 20. The configuration of the nut 40 insures that it stays connected to the ring 24 and does not need to be held manually for the bolt 35 to be threadingly engaged thereto. Other nut configurations are considered as well (e.g., hexagonal nut, square nut, etc), for instance when it is possible to access both sides of the annular wall 20.

The fastening system 30 is devised such that the each set of bolt 35 and nut 40 performs the axial pre-load clamping when the fan 12 is connected to the shaft 13, while the shear loads are substantially absorbed by the sleeve 31. As a result, the bolts 35 do not require to be machined to severe tolerances as they will be loosely fitted into the sleeve 31. The sleeve 31 must have an outer diameter precisely machined to be fitted within each set of throughbores 21 and 23 and to remove any play therebetween. However, the sleeve 31 does not have any threading and is simpler to manufacture than the bolt 35.

In assembling the fan 12 to the shaft 13, the annular walls 20 and 22 are superposed in the manner shown in FIGS. 2 and 3 or in any other appropriate manner. The ring 24 may have been previously positioned on the opposite side of the annular wall 20, with the nuts 40 clinched to the thoughbores 25. With the throughbores 21, 23 and 25 being axially aligned, the sleeve 31 may be fitted in the sets of throughbores 21 and 23, thereby removing any play between the fan 12 and shaft 13. Once the head 32 of the sleeve 31 abuts the surface of the annular wall 22, the male part 35 of the fastener may be inserted in the sleeve 31 and screwingly engaged to the nut 40. As the nut 40 is held captive by its engagement to the ring 24, the screwing of the fastener 35 may be done without manually handling the nut 40. In an embodiment, the male part 35 of the fastener is axially pre-loaded and clamps the fan 12 to the shaft 13.

If one of the sleeves 31 needs to be replaced, the bolt 35 is firstly removed. The sleeve 31 may then be pulled out of the set of throughbores 21 and 23. A replacement sleeve 31 may then be inserted and the bolt 35 may or may not need to be replaced. It is considered to replace the sleeve 31 with a sleeve having a different thickness, to adjust a level of deformation of the sleeve 31 to shear loads. For instance, a lesser thickness may decrease the rigidity of the sleeve 31, thereby causing a greater level of deformation of the sleeve 31 and hence a sharing of the shear load with the sleeves 31 of adjacent fastening systems 30.

The sleeve 31 may be made of any appropriate materials, including nickel, steel, and cobalt alloys. The fastener may be made of the same materials, or other suitable materials. For instance, the fastening system may be used to interconnect any suitable fan or impeller with a shaft. As an alternative to a bolt and nut assembly, the fastener may be a cam locking device, a rivet, a tie shaft, etc.

The above description is meant to be exemplary only, and one skilled in the art will recognize that changes may be made to the embodiments described without departing from the scope of the invention disclosed. For example, the fastening system may be used to interconnect any type of fan or impeller to a shaft, in any appropriate type of engine. Still other modifications which fall within the scope of the present invention will be apparent to those skilled in the art, in light of a review of this disclosure, and such modifications are intended to fall within the appended claims.

What is claimed is:

1. A fan and shaft assembly for a turbofan gas turbine engine comprising:
   a shaft;
   a fan;
   sets of aligned throughbores respectively of the shaft and the fan, at a junction between the shaft and the fan;
   fastening systems for the sets of aligned throughbores, each fastening system comprising a sleeve received in one of the sets of aligned throughbores and sized to fit without play in the set of aligned throughbores, a head of the sleeve abutting a surface at the junction between the shaft and the fan; and a fastener inserted in the sleeve and extending beyond both ends of the sleeve to clamp the fan to the shaft, the fastener being loosely received in the sleeve.

2. The assembly of claim 1, wherein the fastener is a bolt and nut assembly.

3. The assembly of claim 2, wherein the nut is a clinch nut.

4. The assembly of claim 1, wherein the junction of the shaft and the fan comprises co-planar annular walls of the shaft and the fan, with the sets of aligned throughbores being circumferentially distributed on the annular walls.

5. The assembly according to claim 4, further comprising a ring with throughbores being coplanar with the annular wall of the shaft, with the sets of aligned throughbores each including one of the throughbores of the ring.

6. The assembly of claim 5, wherein the fastener is a bolt and nut assembly, and the nut is captively engaged to the ring, and blocked from rotation by contact with the ring.

7. A method for replacing a component of a fastening system retaining a fan to a shaft, comprising:
   removing a fastener from a sleeve, the fastener clamping the fan to the shaft;
   pulling the sleeve out of engagement with the fan and the shaft;
   inserting a replacement sleeve into engagement with the fan and the shaft, without play therebetween; and
   installing the fastener in the replacement sleeve to clamp the fan to the shaft.

8. The method according to claim 7, wherein removing the fastener comprises unscrewing the fastener.

9. The method according to claim 8, wherein unscrewing the fastener comprises handling a single end of the fastener.

10. The method according to claim 7, wherein inserting a replacement sleeve comprises inserting a replacement sleeve having a thickness different from that of the removed sleeve.

11. The method according to claim 10, wherein inserting a replacement sleeve having a different thickness comprises inserting a replacement sleeve having a lesser thickness than that of the removed sleeve.

12. The method according to claim 7, wherein installing the fastener comprises installing a replacement fastener.

13. The method according to claim 7, wherein installing the fastener comprises reinstalling the same fastener.

14. A fastening system for interconnecting a fan to a shaft in a turbofan gas turbine comprising:
   a sleeve configured to be received in a set of aligned throughbores at a junction between the fan and the shaft, an outer diameter of the sleeve being sized to fit without play in the set of aligned throughbores, and a length of the sleeve being sized so as not to extend beyond the set of aligned throughbores at a first end, the sleeve having a head configured to abut a surface of one of the shaft and the fan adjacent to the throughbore at a second end; and
   a fastener having an outer diameter sized to be loosely received in the sleeve, the fastener having a length to extend beyond both ends of the sleeve to clamp the fan to the shaft.

15. The fastening system of claim 14, wherein the fastener is a bolt and nut assembly.

16. The fastening system of claim 15, wherein the nut is a clinch nut.

* * * * *